(12) United States Patent
Davydov et al.

(10) Patent No.: US 10,239,054 B2
(45) Date of Patent: Mar. 26, 2019

(54) FCC COUNTER-CURRENT REGENERATOR WITH A REGENERATOR RISER

(71) Applicant: UOP LLC, Des Plaines, IL (US)

(72) Inventors: Lev Davydov, Northbrook, IL (US); Michael S. Sandacz, Glen Ellyn, IL (US); Paolo Palmas, Des Plaines, IL (US); Zhihao Fei, Naperville, IL (US); Matthew Lippmann, Oak Park, IL (US)

(73) Assignee: UPO LLC, Des Plaines, IL (US)

(*) Notice: Subject to any disclaimer, the term of this patent is extended or adjusted under 35 U.S.C. 154(b) by 0 days.

(21) Appl. No.: 15/828,186

(22) Filed: Nov. 30, 2017

(65) Prior Publication Data

US 2018/0178208 A1    Jun. 28, 2018

Related U.S. Application Data

(60) Provisional application No. 62/439,346, filed on Dec. 27, 2016.

(51) Int. Cl.
*B01J 38/34* (2006.01)
*B01J 8/28* (2006.01)
(Continued)

(52) U.S. Cl.
CPC .............. *B01J 38/34* (2013.01); *B01J 8/1872* (2013.01); *B01J 8/28* (2013.01); *B01J 29/90* (2013.01);
(Continued)

(58) Field of Classification Search
CPC ... B01J 38/20; B01J 38/26; B01J 38/34; B01J 8/28; B01J 8/1872; B01J 8/1863;
(Continued)

(56) References Cited

U.S. PATENT DOCUMENTS

| 3,494,858 A | 2/1970 | Luckenbach |
| 4,313,848 A * | 2/1982 | Scott ........................ B01J 23/92 110/345 |
| 7,915,191 B2 | 3/2011 | Hedrick |

FOREIGN PATENT DOCUMENTS

| CN | 102049319 A | 6/2013 |
| CN | 105457566 A | 4/2016 |

OTHER PUBLICATIONS

Zhang, "A Practical Countercurrent Fluid Catalytic Cracking Regenerator Model for in Situ Operation Optimization", AIChE Journal, Sep. 2012, vol. 58, No. 9, p. 2770-2784.
(Continued)

*Primary Examiner* — Lessanework Seifu
(74) *Attorney, Agent, or Firm* — Paschall & Maas Law Office; James C. Paschall (57) ABSTRACT

A counter-current catalyst regenerator with at least two stages of counter-current contact along with a regenerator riser is proposed. Each stage may comprise a permeable barrier that allows upward passage of oxygen-containing gas and downward passage of coked catalyst into each stage, but inhibits upward movement of catalyst to mitigate back mixing and approximate true counter-current contact and efficient combustion of coke from catalyst. The regenerator riser may provide a passage to transport the catalyst and may serve as a secondary stage for coke combustion to provide the regenerated catalyst.

20 Claims, 2 Drawing Sheets

(51) Int. Cl.
  B01J 8/18     (2006.01)
  C10G 11/18    (2006.01)
  B01J 38/20    (2006.01)
  B01J 29/90    (2006.01)
  F23C 13/08    (2006.01)
  B01J 38/70    (2006.01)
  B01J 38/02    (2006.01)
  F27B 15/09    (2006.01)

(52) U.S. Cl.
  CPC ............... *B01J 38/02* (2013.01); *B01J 38/20* (2013.01); *B01J 38/70* (2013.01); *C10G 11/182* (2013.01); *F23C 13/08* (2013.01); *F27B 15/09* (2013.01); *B01J 2208/00938* (2013.01)

(58) Field of Classification Search
  CPC ...... B01J 2208/00938; B01J 2208/0084; B01J 2208/00893; C10G 11/182
  See application file for complete search history.

(56) References Cited

OTHER PUBLICATIONS

Zhang, "A Practical Model for a Dense-Bed Countercurrent FCC Regenerator", 10th International Conference on Circulating Fluidized Beds and Fluidization Technology—CFB-10, Spring 2011, Eds, ECI Symposium Series, vol. RP7. http://dc.engconfintl.org/cfb10/38.

PCT Search Report dated Feb. 14, 2018 for corresponding PCT Application No. PCT/US2017/056764.

* cited by examiner

FCC COUNTER-CURRENT REGENERATOR WITH A REGENERATOR RISER

CROSS-REFERENCE TO RELATED APPLICATION

This application claims priority from Provisional Application No. 62/439,346 filed Dec. 27, 2016, the contents of which cited application are hereby incorporated by reference in its entirety.

FIELD

The field of the subject matter relates to catalyst regeneration in fluidized catalytic cracking units, and more particularly relates to a counter-current catalyst regenerator with a regenerator riser.

BACKGROUND

Fluid catalytic cracking (FCC) is a hydrocarbon conversion process accomplished by contacting hydrocarbons in a fluidized reaction zone with a catalyst. As the cracking reaction proceeds substantial amounts of highly carbonaceous material referred to as coke are deposited on the catalyst. A high temperature regeneration operation within a regeneration zone combusts coke from the catalyst. Coke-containing catalyst, referred to herein as coked catalyst, is continually removed from a reactor and replaced by essentially coke-free catalyst from a regenerator.

In the regenerator, the coke is burned from the catalyst with oxygen-containing gas, usually air. Flue gas formed by burning coke in the regenerator may be treated for removal of particulates and heat recovery by oxidation of carbon monoxide. The main goal of the regenerator is to burn the coke off the catalyst, so high coke burn efficiency i.e. combusting most of the coke in shorter residence time, is preferred because it will reduce the equipment size, operational cost and emission levels.

After burn is a phenomenon that occurs when hot flue gas that has been separated from regenerated catalyst contains carbon monoxide that combusts to carbon dioxide in a dilute phase of catalyst containing oxygen. Incomplete combustion of coke to carbon dioxide can result from insufficient oxygen in the combustion gas, poor fluidization or aeration of the coked catalyst in the regenerator vessel or poor distribution of coked catalyst in the regenerator vessel. The heat from after burn can be detrimental to regenerator equipment.

Because FCC units that process heavy residue feed generate more heat than is needed to vaporize feed and to promote the cracking reaction it is desirable to control the regeneration temperature and heat release to the reactor. The two most common ways to control regeneration temperature are to control the ratio of carbon dioxide to carbon monoxide and to use catalyst coolers to generate steam and cool the catalyst. It is most economical to run at the highest carbon monoxide concentration possible in the flue gas to recovery heat from the flue gas in a downstream CO boiler. However, operating at a low $CO_2$-to-CO ratio carries the risk of after burn and uncombusted coke left on catalyst.

Several types of catalyst regenerators are in use today. A conventional bubbling bed regenerator typically has just one section in which air is bubbled through a dense catalyst bed. Coked catalyst is added, and regenerated catalyst is withdrawn from the same dense catalyst bed. In order to maximize the regenerated catalyst activity at a given make up catalyst rate, the carbon on catalyst must be reduced to a minimum.

Most modern residue fluid cracking units use a two-stage bubbling bed regenerator to finish the catalyst clean up and reduce the carbon on catalyst to a minimum. Two-stage bubbling beds have two sections. Coked catalyst is added to a dense bed in an upper, first section and is partially regenerated with air in flue gas from a second stage. The partially regenerated catalyst is transported to a dense bed in a lower, second section and completely regenerated with air. The completely regenerated catalyst is withdrawn from the second section. The second stage is generally operated in complete combustion where all carbon monoxide is converted to carbon dioxide and an excess of oxygen is present in the flue gas.

In a one or two-stage fluidized bubbling bed regenerator, catalyst lifted upwardly by air distributed into the regenerator falls non-uniformly in a phenomenon called back mixing. In bubbling beds, the catalyst phase is back mixed from top to bottom while the gas phase is nearly plug flow with a high oxygen concentration at the bottom and low oxygen concentration at the top. Back mixing causes the residence time to increase and the combustion rate to be non-uniform which can generate hot spots, increase catalyst deactivation and reduce combustion efficiency. Back mixing also lowers the catalyst bed density thereby increasing the equipment size.

FCC regenerators are large in size and costly to build. They are large because of the requirement to stage air supply to burn large amounts of coke on spent catalyst. Without staging the combustion of coke is likely to generate enough heat to destroy the zeolite framework of the catalyst and render it inactive.

Therefore, there is a need for improved processes and apparatuses for efficiently regenerating catalyst while preventing after burn and back mixing. There is a need for a process and an apparatus to better control coke and oxygen concentration and temperature profiles in a regenerator which promotes more efficient combustion of coke from catalyst. Further, there is a need for an apparatus that improves FCC regenerator efficiency and reduces vessel size.

SUMMARY

The disclosed subject matter is a counter-current catalyst regenerator with at least two stages of counter-current contact along with a regenerator riser. Each stage may comprise a permeable barrier that allows upward passage of oxygen-containing gas and downward passage of coked catalyst into each stage, but inhibits upward movement of catalyst to mitigate back mixing and approximate true counter-current contact and efficient combustion of coke from catalyst. The regenerator riser may provide a passage to transport the catalyst and/or may serve as a secondary stage for coke combustion to provide the regenerated catalyst.

DETAILED DESCRIPTION

A new regenerator is proposed in which catalyst and gas flow counter-currently to each other in multiple stages and is provided with internal or external regenerator riser to facilitate catalyst transport. A permeable barrier above each stage may facilitate counter-current flow of catalyst by mitigating catalyst back mixing. The permeable barrier can also have a structure that facilitates effective mixing between catalyst and combustion gas. Each stage may also include a section of open volume between adjacent permeable barriers. A catalyst flows downwardly from a stage through a subjacent permeable barrier and oxygen-containing gas flows upwardly from the stage through superjacent permeable barrier. One or more stages may be assembled in the regenerator vessel to approach true counter-current flow conditions. Further, the regenerator riser may serve as the last polishing stage of catalyst regeneration after the countercurrent regeneration in the multiple stages. Alternatively, the regenerator riser may serve as the first stage of the regeneration process.

In the new regenerator, catalyst flow and catalyst residence time are more uniform. The residence time necessary for the catalyst to achieve complete coke burn can be accurately controlled and therefore reduced. The thermal deactivation of catalyst due to randomly long residence time can be avoided. Additionally, the counter-current flow regime generates a favored concentration profile along the regenerator vessel. At the top, initial stage, the catalyst has the highest coke concentration but the combustion gas has a low oxygen concentration, so after burn can be avoided. At the bottom, last stage, the oxygen-containing gas has the highest oxygen concentration, but the catalyst has the lowest coke concentration, so again the after burn can be prevented.

Catalyst density can be increased in the regenerator vessel because the catalyst downward flow pattern is more uniform. Consequently, for the same catalyst inventory, the regenerator size can be smaller. Additionally, because the oxygen concentration can be higher where the coke concentration on catalyst is lower, the overall oxygen-containing gas flow rate can be reduced, so the regenerator size and operation cost can be reduced. Further, by using internal or external risers to facilitate catalyst transport a shorter regenerator vessel is sufficient. In this manner, a spent catalyst standpipe and a regenerated catalyst standpipe can be brought closer together and the FCC unit can become shorter thus saving capital costs.

Figure 1:
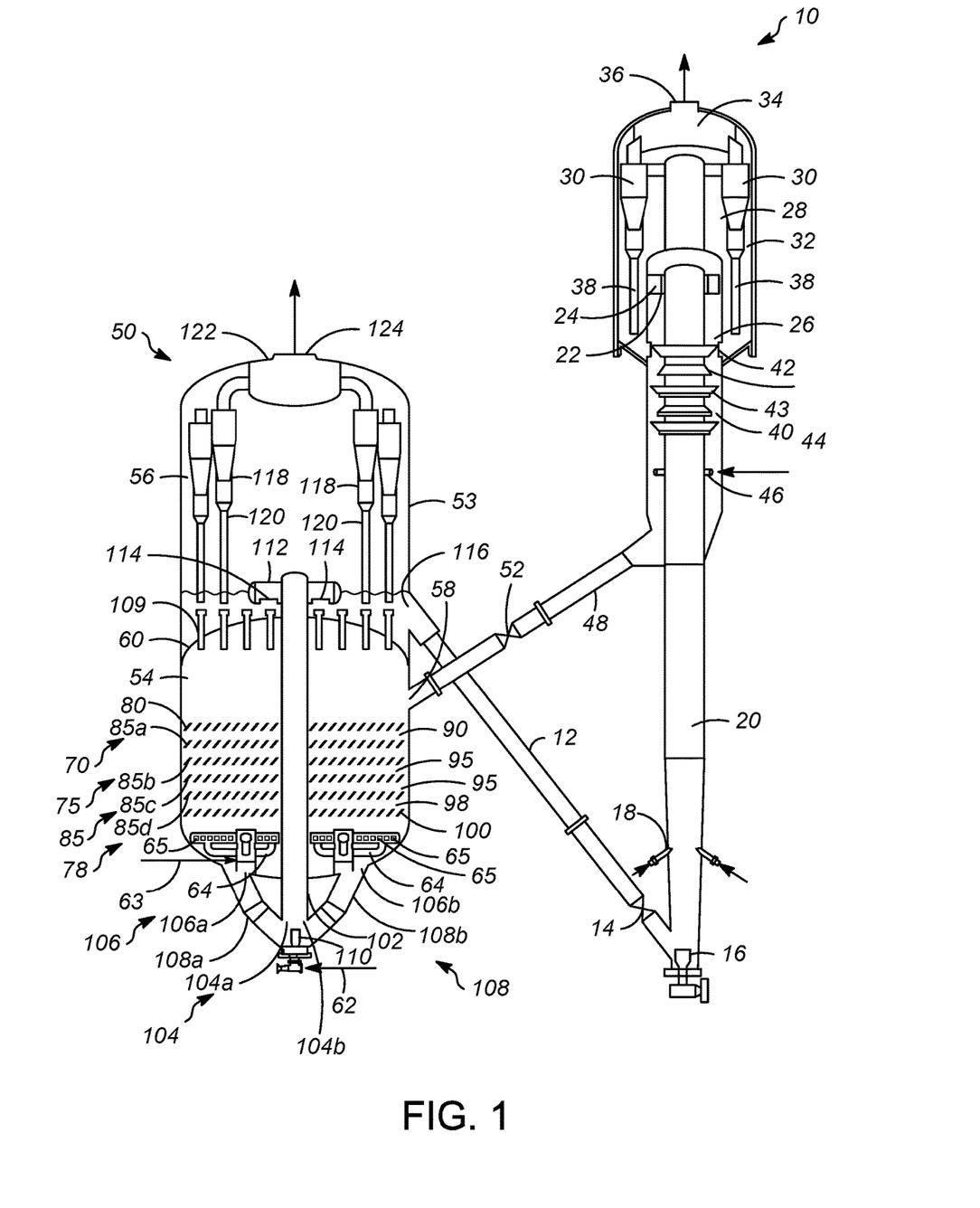
FIG. 1 is a schematic, elevational view of an FCC unit incorporating the present subject matter according to an embodiment.

Although other uses are contemplated, the process and apparatus may be embodied in an FCC unit. FIG. 1 shows an FCC unit that includes a reactor section 10 and a regenerator vessel 50. A regenerated catalyst conduit 12 transfers regenerated catalyst from the regenerator vessel 50 at a rate regulated by a control valve 14 to a riser 20 of the reactor section 10. An inert fluidization medium such as steam from a nozzle 16 transports regenerated catalyst upwardly through the riser 20 at a relatively high density until a plurality of feed distributor nozzles 18 inject hydrocarbon feed perhaps mixed with inert gas such as steam across the upwardly flowing stream of catalyst particles. The catalyst contacts the hydrocarbon feed cracking it to produce smaller, cracked hydrocarbon products while depositing coke on the catalyst to produce coked catalyst.

A conventional FCC hydrocarbon feedstock and higher boiling hydrocarbon feedstock are suitable fresh hydrocarbon feed streams. The most common of such conventional fresh hydrocarbon feedstocks is a "vacuum gas oil" (VGO), which is typically a hydrocarbon material having a boiling range with an IBP of no more than about 340° C. (644° F.), a T5 between about 340° C. (644° F.) to about 350° C. (662° F.), a T95 between about 555° C. (1031° F.) and about 570° C. (1058° F.) and/or an EP of no more than about 640° C. (1184° F.) prepared by vacuum fractionation of atmospheric residue. Such a fraction is generally low in coke precursors and heavy metal contamination which can serve to contaminate catalyst. Atmospheric residue is a preferred feedstock boiling with an IBP not more than about 340° C. (644° F.), a T5 between about 340° C. (644° F.) and about 360° C. (680° F.) and/or a T95 of between about 700° C. (1292° F.) and about 900° C. (1652° F.) obtained from the bottom of an atmospheric crude distillation column. Atmospheric residue is generally high in coke precursors and metal contamination. Other heavy hydrocarbon feedstocks which may serve as fresh hydrocarbon feed include heavy bottoms from crude oil, heavy bitumen crude oil, shale oil, tar sand extract, deasphalted residue, products from coal liquefaction and vacuum reduced crudes. Fresh hydrocarbon feedstocks also include mixtures of the above hydrocarbons and the foregoing list is not comprehensive.

The FCC catalyst includes a large pore zeolite, such as a Y-type zeolite and a matrix material comprising an active alumina material, a binder material, including either silica or alumina, and an inert filler such as kaolin. In accordance with an exemplary embodiment, suitable FCC catalyst may include Upgrader from Albemarle Corporation located in Baton Rouge, La. The FCC catalyst may also include 1 to 25 wt % of a medium or smaller pore zeolite catalyst, such as a MFI zeolite, dispersed on a matrix including a binder material such as silica or alumina and an inert filler material such as kaolin.

The resulting mixture of cracked hydrocarbon products and coked catalyst continues upwardly through the riser 20 to a top at which a plurality of disengaging arms 22 tangentially and horizontally discharge the mixture of gas and catalyst from a top of the riser 20 through ports 24 into a disengaging vessel 26 that effects a rough separation of gases from the catalyst. A transport conduit 28 carries the hydrocarbon vapors, including stripped hydrocarbons, stripping media and entrained catalyst to one or more cyclones 30 in a reactor vessel 32 which separates coked catalyst from the hydrocarbon vapor stream. The reactor vessel 32 may at least partially contain the disengaging vessel 26, and the disengaging vessel 26 is considered part of the reactor vessel 32. A collection section 34 in the reactor vessel 32 gathers the separated hydrocarbon vapor streams from the cyclones 30 for passage to an outlet nozzle 36 and eventually into a fractionation recovery zone (not shown). Diplegs 38 discharge catalyst from the cyclones 30 into a lower portion of the reactor vessel 32, and the catalyst and adsorbed or entrained hydrocarbons pass into a stripping section 40 of the reactor vessel 32 across ports 42 defined in a wall of the disengaging vessel 26. Catalyst separated in the disengaging vessel 26 passes directly into the stripping section 40. The stripping section 40 contains baffles 43, 44 or other equipment to promote mixing between a stripping gas and the catalyst. The stripping gas enters a lower portion of the stripping section 40 through a conduit to one or more distributors 46. The stripped, coked catalyst leaves the stripping section 40 of the reactor vessel 32 through a reactor catalyst conduit 48 and passes to the regenerator vessel 50 at a rate regulated by a control valve 52. The coked catalyst from the reactor vessel 32 usually contains carbon in an amount of from 0.2 to 2 wt %, which is present in the form of coke. Although coke is primarily composed of carbon, it may contain from 3 to 12 wt % hydrogen as well as sulfur and other materials.

The regenerator vessel 50 for combusting coke from catalyst comprises a regeneration section 54 and a separation section 56. In accordance with an exemplary embodiment as shown in the FIG. 1, the regeneration section 54 may be above the separation section 56. The regeneration section 54 may include one or more stages for countercurrent regeneration of a catalyst, described below in detail. The reactor catalyst conduit 48 may provide a coked catalyst to the regeneration section 54 through a catalyst inlet 58 in the regeneration section. In some embodiments, the reactor catalyst conduit 48 may extend through a wall 53 of the regenerator vessel 50 above the one or more stages to a coked catalyst distributor for distributing coked catalyst in the regeneration section 54. The coked catalyst distributor may comprise a header for receiving coked catalyst from the reactor catalyst conduit 48 and an array of nozzles comprising catalyst inlets for dispensing coked catalyst downwardly from the header into the regeneration section 54. The coked catalyst may pass downwardly through the one or more stages, described later in detail. Each of the one or more stages may comprise a permeable barrier.

In the regeneration section 54, at least 90 wt % of the combustion of coke on the catalyst occurs. The regeneration section 54 may be separated from the separation section 56 by a separation wall 60. The wall 60 may have a hemispherical configuration. In the instant embodiment, the regeneration section 54 and separation section 56 may be the regeneration chamber 54 and the separation chamber 56, respectively. The regeneration section 54 may be apportioned into the one or more stages 70, 75 and 78. We have found that two stages of countercurrent contact of coked catalyst and oxygen-containing gas provides increased volume reduction over a single bubbling bed regenerator. Three stages of countercurrent contact provides increased volume reduction, but the increasing benefit of volume reduction begins to incrementally diminish at four and five stages. More than five stages appears to provide less incremental benefit which may not be economically justified. Each of the one or more stages may include a permeable barrier having openings sized to permit the coked catalyst to pass through downwardly, the permeable barrier extending laterally across the regenerator vessel. In various embodiment, the one or more stages may be categorized as a first stage 70, one or more intermediate stages 75 and the last stage 78.

In accordance with an exemplary embodiment as shown in the FIG. 1, the one or more stages may comprise a first stage 70 disposed below the catalyst inlet 58. The first stage 70 may be defined on an upside by a first permeable barrier 80. The first permeable barrier 80 extends laterally across the regenerator vessel. In an aspect, the first permeable barrier 80 extends laterally across the entire regeneration section 54 of the regenerator vessel 50 contiguously with the wall 53 of the regenerator vessel 50. The catalyst inlet 58 delivers coked catalyst above the first stage and in an aspect, the first permeable barrier 80.

The first permeable barrier 80 may comprise any structure that allows upward flow of gas and downward flow of catalyst, but inhibits back mixing or upward flow of catalyst that may be entrained in the gas. Consequently, upward movement of catalyst is prevented above the first stage 70 by the first permeable barrier 80 more so than if the first permeable barrier 80 were not present. The first permeable barrier 80 may comprise inclined vanes, gratings, structural packing, baffles, including disc and doughnut baffles, chevrons and shed decks, perforated plates and the like. An intermediate permeable barrier 85 may be spaced below the first permeable barrier 80 to define a first section 90 between that is devoid of internal structure.

One or more intermediate stages 75 may be disposed below the first stage 70. Each stage in the one or more intermediate stages 75 may be defined on an upside by the intermediate permeable barrier 85. The intermediate permeable barrier 85 extends laterally across the regenerator vessel 50. In an aspect, the intermediate permeable barrier 85 extends laterally across the entire regeneration section 54 of the regenerator vessel 50 contiguously with the wall 53 of the regenerator vessel 50. In accordance with an exemplary embodiment as shown in the FIG. 1, the regeneration section 54 comprises three intermediate stages defined on an upside by the intermediate permeable barriers 85a, 85b and 85c, respectively. The regeneration section also includes a last intermediate barrier 85d.

An intermediate permeable barrier 85b, 85c, 85d may be spaced below an adjacent intermediate permeable barrier 85a, 85b, 85c located immediately above to define an intermediate section 95 there between that is devoid of internal structure. The intermediate section 95 may extend laterally across the regenerator vessel 50 between two adjacent intermediate permeable barriers 85a, 85b, 85c. Accordingly, the section formed between two adjacent permeable barriers may extend laterally across the regenerator vessel 50. The intermediate permeable barrier 85 may comprise any structure that allows upward flow of gas and downward flow of catalyst, but inhibits back mixing or upward flow of catalyst that may entrain in the combustion gas, similar or the same as the first permeable barrier 80. It is contemplated that the first section 90 and the intermediate section(s) 95 may contain further internal structure to inhibit back mixing of catalyst or facilitate contact between catalyst and gas.

The last stage 78 may be disposed below the one or more intermediate stages. In accordance with an exemplary embodiment as shown in the FIG. 1, the last stage 78 is the fifth stage and may be disposed below a fourth stage 75 or a third intermediate permeable barrier 85c. The last stage 78 may be defined on an upside by a last intermediate permeable barrier 85d. The last intermediate permeable barrier 85d may extend laterally across the regenerator vessel 50. In an aspect, the last intermediate permeable barrier 85d extends laterally across the entire regeneration section 54 of the regenerator vessel 50 contiguously with the wall 53 of the regenerator vessel 50. The last intermediate permeable barrier 85d may be spaced apart below the intermediate permeable barrier 85c of a last intermediate stage 75 to define the last intermediate section 95 therebetween that is devoid of internal structure. The last intermediate permeable barrier 85 may comprise any structure that allows upward flow of gas and downward flow of catalyst, but inhibits back mixing or upward flow of catalyst that may entrain in the combustion gas, similar or the same as the first permeable barrier 80.

In an embodiment, only five stages of counter-current contact are provided. More or less stages may be provided, but volume reduction diminishes after four or five stages of counter-current contact between coked catalyst and oxygen-containing gas.

A last permeable barrier 100 may extend laterally across the regenerator vessel 50. In an aspect, the last permeable barrier 100 extends laterally across the entire regeneration section 54 of the regenerator vessel 50 contiguously with the wall 53 of the regenerator vessel 50. In accordance with an exemplary embodiment as shown in FIG. 1 including five stages, the last permeable barrier 100 may be spaced apart below the last intermediate permeable barrier 85*d* to define a last section 98 therebetween that is devoid of internal structure. The last section 98 may extend laterally across the regenerator vessel 50 between the last intermediate permeable barrier 85*d* and the last permeable barrier 100. The last permeable barrier 100 may comprise any structure that allows upward flow of gas and downward flow of catalyst, but inhibits back mixing or upward flow of catalyst that may entrain in the combustion gas, similar or the same as the first permeable barrier 80. It is contemplated that the last section 98 may contain further internal structure to inhibit back mixing of catalyst or facilitate contact between catalyst and gas.

Each of the permeable barriers may be supported on the wall 53 of the regeneration section 54 with additional support as necessary. The height of the spacing of sections 90, 95 and 98 between permeable barriers 80, 85 and 100 may be the same as the height of the permeable barrier. In an aspect, the height of the spacing of sections 90, 95 and 98 may be about one-half to about three-fourths the height of the permeable barrier above it. Moreover, the height of the spacing of sections 90, 95 and 98 between permeable barriers 80, 85 and 100 may be one-sixth to three-eighths of the diameter of the regeneration section 54. Moreover, the height of the permeable barrier may be as much as one-third of the diameter of the regeneration section 54.

A primary stream of oxygen-containing gas, typically air, is passed upwardly through the one or more stages in counter-current contact with the coked catalyst from the catalyst inlet 58 to combust coke from the coked catalyst to provide a regenerated catalyst and a first flue gas. Accordingly, the first flue gas may be the flue gas generated via combustion of coke from the coked catalyst in the one or more stages. In accordance with an exemplary embodiment as shown in the FIG. 1, the primary stream of oxygen containing gas may be provided from a combustion gas in line 63. In accordance with an exemplary embodiment as shown in the FIG. 1, the primary stream of oxygen containing gas may be delivered by a primary combustion gas distributor 64 through an oxygen-containing gas inlets 65 to the regeneration section 54 in the regenerator vessel 50. The oxygen-containing gas counter-currently contacts coked catalyst in the lower, regeneration section 54 under flow conditions which will include a superficial gas velocity of 0.3 m/s (1 ft/s) to 2.2 m/s (7 ft/s) and a catalyst density of from about 320 kg/m3 (20 lb/ft3) to about 750 kg/m3 (35 lb/ft3) in the counter-current contacting stages 70, 75 and 78. The catalyst density will be about 16 kg/m$^3$ (1 lb/ft$^3$) to about 80 kg/m$^3$ (5 lb/ft$^3$) in the dilute phase in the separation section 56. The oxygen in the combustion gas contacts the coked catalyst and combusts carbonaceous deposits from the catalyst. Oxygen may be added in proportion to combust coke from the coked catalyst in a partial burn or full burn mode to generate the first flue gas and regenerated catalyst. In accordance with an exemplary embodiment as shown in the FIG. 1, one or more vent tubes 109 may be present for passage of the first flue gas from the regeneration section 54 to the separation section 56.

The process of combusting coke from coked catalyst begins with passing a first stream of coked catalyst downwardly from the catalyst inlet 58 through the first stage 70. In one example, a catalyst distributor may roughly distribute coked catalyst through its nozzles along the top of the first permeable barrier 80. The first stream of coked catalyst may pass through an opening or openings in the first permeable barrier 80 into the first stage 70. A first stream of oxygen-containing gas is compelled upwardly through the first stage 70 in counter-current contact with the first stream of coked catalyst at high temperature to combust coke deposits from the first stream of coked catalyst. The counter-current contacting occurs in the first section 90. The first stream of oxygen-containing gas has been in contact with all of the lower stages and has a large concentration of flue gas and a smaller concentration of oxygen. However, the first stream of coked catalyst in the first stage has the highest concentration of coke deposits. Hence, the high concentration of coke deposits provides a large differential driving force which readily combusts coke in the low concentration of oxygen in the first stage 70. Additionally, in the first stage 70 hot flue gas highly concentrated in oxygen may strip adsorbed hydrocarbons from the coked catalyst due to less availability of oxygen. Stripping removes adsorbed coke and combustion causes some of the coke deposits to combust from the catalyst to produce flue gas and provides a second stream of coked catalyst including at least partially regenerated catalyst with a lower concentration of coke and a stream of flue gas with a low concentration of oxygen.

The stream of flue gas is passed upwardly from the first stage 70 through the first permeable barrier 80. However, the first permeable barrier 80 inhibits upward movement of the coked catalyst in the first stage, causing it to lose upward momentum and fall downwardly in the first stage 70. Consequently, the second stream of coked catalyst moves downwardly through an opening or openings in the second permeable barrier from the first stage 70 into the first intermediate stage 75 below the first stage in opposite direction to the upwardly flowing second stream of oxygen-containing gas. In an aspect, all of the gas from the first stage 70 passes upwardly through an opening or openings in the first permeable barrier 80, and at least 99 wt % of the catalyst from the first stage passes downwardly through an opening or openings in the first intermediate permeable barrier 85*a* located immediately below the first permeable barrier 80.

Similarly, an intermediate stream of oxygen-containing gas is passed upwardly through the one or more intermediate stages 75 in counter-current contact with the intermediate stream of coked catalyst in each of the one or more intermediate stages 75. For example, a second stream of oxygen-containing gas is passed upwardly through the first intermediate stage 75 in counter-current contact with the second stream of coked catalyst descending from the first stage 70 to combust coke from the second stream of coked catalyst. A stream of oxygen-containing gas in a lower intermediate stage 75 has a larger oxygen concentration than a stream of oxygen-containing gas in an upper intermediate stage 75, but the coke concentration on catalyst in the lower intermediate stage is lower than the coke concentration of coked catalyst in the upper intermediate stage. Hence, a differential driving force is maintained to drive combustion of the smaller concentration of coke deposits in the second stream of catalyst. The counter-current contacting may occur in the intermediate section 95 in the intermediate stage 75.

The counter-current contacting of the intermediate stream of coked catalyst and the intermediate stream of oxygen-containing gas combusts coke from the catalyst to produce a stream of coked catalyst including regenerated catalyst with a reduced concentration of coke deposits and a stream of oxygen-containing gas including flue gas. The stream of coked catalyst in the intermediate stage 75 is inhibited from upward movement by the intermediate permeable barrier 85 and loses its momentum. Consequently, the stream of coked catalyst provided by the intermediate stage 75 moves downwardly through an opening or openings in the intermediate permeable barrier 85 of an upper intermediate stage 75 in opposite direction to the upwardly flowing stream of oxygen-containing gas produced in a lower intermediate stage 75. In an aspect, all of the gas from the intermediate stage 75 passes upwardly through an opening or openings in the intermediate permeable barrier 85 located immediately above the lower intermediate permeable barrier 85, and at least 99 wt % of the catalyst from the intermediate stage 75 passes downwardly through an opening or openings in the last intermediate permeable 85*d* barrier located immediately below the intermediate permeable barrier 85.

In accordance with an exemplary embodiment as shown in the FIG. 1 including five stages, an initial stream of oxygen-containing gas is passed upwardly through the last stage 78 in counter-current contact with the last stream of coked catalyst descending from a last intermediate stage 95 to combust coke from the last stream of coked catalyst. In an embodiment, the initial stream has encountered very little coked catalyst because the last stage 78 is just above the distributor 64. However, the coke concentration on the catalyst in the last stream of coked catalyst in the last stage 78 is very low, much lower than the coke concentration in the stream of coked catalyst in the upper first stage 70 and intermediate stages 75, because the last stream of coked catalyst has encountered more oxygen in more stages of counter-current contacting. Hence, a differential driving force is maintained to drive combustion of the smaller concentration of coke deposits in the last stream of coked catalyst with the larger concentration of oxygen in the initial stream of oxygen-containing gas. The counter-current contacting may occur in the last section 98 to polish off any remaining coke deposits on the catalyst.

The counter-current contacting of the last stream of coked catalyst and the initial stream of oxygen-containing gas combusts coke from the catalyst to produce regenerated catalyst stream with a reduced concentration of coke deposits and an intermediate stream of oxygen-containing gas including flue gas. This regenerated catalyst stream may have very little coke and be considered fully regenerated catalyst. However, in some embodiments, the regenerated catalyst stream may be partially regenerated catalyst. The intermediate stream of oxygen-containing gas from the last stage is passed through the last intermediate permeable barrier 85*d* into the last intermediate stage. The catalyst in the last stage 78 is inhibited from upward movement by the last intermediate permeable barrier 85*d* and loses its momentum. Consequently, the regenerated catalyst stream of coked catalyst moves downwardly through an opening or openings in the last permeable barrier 100 from the last stage 78 in opposite direction to the upwardly flowing initial stream of oxygen-containing gas. The regenerated catalyst stream passes through the last permeable barrier 100 past the distributor 64 to a regenerator riser 102, as discussed in detail below.

Because in the counter-current contacting of coked catalyst and primary stream of oxygen-containing gas, the oxygen-containing gas is introduced below the stages 70, 75 and 78, oxygen in the stage is consumed. We have found that the ratio of carbon dioxide to carbon monoxide maximizes in the intermediate stages 75. In stages that are higher in the regenerator but with a lower stage number, less oxygen is available, consequently, a ratio of carbon dioxide to carbon monoxide is lower in the first stage 70 than in the intermediate stages 75. Moreover, in the lower intermediates stages 75 and the final stage 78 where coke is less available, the ratio of carbon dioxide to carbon monoxide is lower. For example, the ratio of carbon dioxide to carbon monoxide is lower in the final stage 78 than in the intermediate stages 75 and even than in the initial stage 70. Most importantly, the ratio of carbon dioxide to carbon monoxide is smaller in the first stage than in the lower stages and typically all stages with the exception of the last stage 78 in which sufficient residence time may not be available for carbon monoxide to oxidize to carbon dioxide despite the great availability of oxygen. Nevertheless, the first flue gas exiting the first stage 70 will have a higher concentration of carbon monoxide which can be recovered in a CO boiler with less risk of after burn because the concentration of oxygen in the flue gas is lower in the higher stages with the lower stage numbers.

A portion of the primary stream of oxygen-containing gas may be diverted and fed to one of the stages 70, 75 and 78 separately (not shown) and/or a portion of a flue gas stream containing oxygen gas from a subjacent stage 75, 78 may be diverted to a superjacent stage 70, 75 to boost the oxygen concentration in the stage.

Although not shown in the Figures, catalyst coolers may be used if needed to cool a stream of coked catalyst such as by indirect heat exchange with liquid water to make steam. The cooled catalyst may be taken from and delivered to one of the stages 70, 75 and 78, preferably at or below the first stage 70. In another example, a stream of coked catalyst can be taken from a stage at or below the first stage 70, cooled and returned to the intermediate stage or below the stage from which it was taken. A catalyst cooler that withdraws catalyst from a stage 70, 75 or 78, cools it and returns the cooled catalyst to the same or subjacent stage is preferable.

In an embodiment, the regenerated catalyst obtained after counter-current regeneration below the last stage of the one or more stages may be passed from the regeneration section 54 to a bottom of the regenerator riser 102. The regenerator riser 102 preferably may have a vertical orientation within the regenerator vessel 50 and may extend upwardly from the bottom of the regenerator vessel 50 through an axial center of the regenerator vessel 50 although other orientations are also possible. The regeneration section 54 may comprise an outlet for passing the regenerated catalyst from the regeneration section 54 to the bottom of the regenerator riser 102. In accordance with an exemplary embodiment as shown in the FIG. 1, the regeneration section 54 may include a regeneration section outlet 106 in the bottom of the regeneration section 54. In an embodiment, the regeneration section outlet may include a first outlet 106*a* and a second outlet 106*b*. In accordance with an exemplary embodiment as shown in the FIG. 1, the bottom of the regenerator riser 102 is located below the regeneration section 54 and may include an inlet 104. In an embodiment, the bottom of the regeneration section may include a first inlet 104*a* and a second inlet 104*b*. In accordance with an exemplary embodiment as shown in FIG. 1, the bottom of the regenerator riser 102 may be in communication with the regeneration section outlet 106 via a regenerator riser conduit 108 extending from the regeneration section outlet to the inlet of the regenerator riser 102. In an embodiment, the bottom of the regenerator riser 102 may be in communication with the regeneration section outlet 106 via a first regenerator riser conduit 108*a* and a second regenerator riser conduit 108*b*. In accordance with an exemplary embodiment as shown in the FIG. 1, the first inlet 104*a* and the second inlet 104*b* of the regenerator riser 102 are in communication with the regeneration section 54 via the first regenerator riser conduit 108*a* and the second regenerator riser conduit 108*b*, respectively. Subsequently, the regenerated catalyst is propelled via a secondary stream of gas to move the regenerated catalyst from the bottom to a top of the regenerator riser 102. In accordance with an exemplary embodiment as shown in the FIG. 1, the regenerator riser 102 may be located and passes through inside of the vessel 50. The secondary stream of gas may be introduced through a secondary gas distributor 110. In an embodiment, the secondary stream of gas may be an oxygen containing gas. In accordance in an exemplary embodiment as shown in the FIG. 1, the secondary stream of gas may be provided by the combustion gas in line 62.

In an embodiment, where partially regenerated catalyst is obtained downstream of the one or more stages, coke on the partially regenerated catalyst provided to the bottom of the regenerator riser is combusted as the catalyst is propelled upwardly through the regenerator riser 102 to provide a completely regenerated catalyst at the top of the regenerator riser. The completely regenerated catalyst may be discharged from an outlet 114 at the top of the regenerator riser 102. The regenerator riser comprises a disengager 112 comprising the outlet 114 for discharging the regenerated catalyst. The outlet 114 may be positioned in or above the upper surface of the fluidized bed to receive flue gases and catalyst and initially separate catalyst from a second flue gas generated in the regenerator riser. In an aspect, heavier catalyst goes down and lighter gas goes up after exiting the outlet 114 of the disengager 112 to effect a rough separation. The second flue gas may be the flue gas generated via combustion of coke from the catalyst in the regenerator riser 102. The $CO_2$-to-CO mole ratio for the second flue gas from the regenerator riser may be between about 3 to about 5. The regenerated catalyst collects in the fluidized catalyst bed in the separation section 56 and may be passed from a regenerated catalyst outlet 116 to the riser reactor 20 through the regenerated catalyst standpipe 12. In an embodiment, a fluffing fluidizing gas may be provided to the separation section 56 to remove entrained flue gas from the catalyst and to fluidize catalyst to facilitate its removal from the separation section 56. In an aspect, the fluffing fluidizing gas may be provided by the first flue gas from the first stage 90 passing through the one or more vent tubes 109 from the regeneration section 54 into the catalyst bed in the separation section 56.

The flue gas including the first flue gas generated in the regeneration section 54 and the second flue gas from the regenerator riser 102 will usually contain a light loading of catalyst particles and may ascend in the separation section 56. The flue gas consisting primarily of $N_2$, $H_2O$, $O_2$, $CO_2$ and traces of $NO_x$, CO, and $SO_x$ passes upwardly from the dense bed into a dilute phase of the regeneration vessel 50. The catalyst may be disengaged from flue gas which can then be discharged from a flue gas outlet above all the stages 70, 75 and 78 including the first stage 70. The separation section 56 will contain a dilute phase of catalyst above the catalyst bed with catalyst entrained in the ascending flue gas stream. In accordance with an exemplary embodiment as shown in the FIG. 1, the flue gas may be processed through a separation device such as a regenerator cyclone 118 to further separate catalyst from flue gas. The regenerator cyclone 118 or other means removes entrained catalyst particles from the rising flue gas and a dipleg 120 may release catalyst which may be distributed on or near a top of the catalyst bed in the separation section 56.

For partial burn conditions, the carbon monoxide concentration in the flue gas may be maintained at least at about 200 ppm and preferably at least about 3 mole %, the $CO_2$-to-CO mole ratio may be between about 0.5 to about 4.0, and preferably no more than about 0.9 and at least about 0.5 and preferably at least about 0.8 and the oxygen concentration in the flue gas stream exiting the first stage 70 may be less than about 0.4 mole % and preferably no greater than about 0.2 mole %. For full burn conditions, the carbon monoxide concentration in the flue gas may be maintained at less than about 200 ppm, the $CO_2$-to-CO mole ratio may be at least about 1.0 and the oxygen concentration in the flue gas stream exiting the first stage 70 may be greater than about 0.4 mole %. Further, oxygen concentration for partial burn conditions may be between about 1000 pppw and about 0 pppw, wherein 0 ppmw signifies lowest detectable value of the oxygen concentration in the flue gas. For full burn conditions, the oxygen concentration would be greater than about 5000 ppm and no greater than about 5 wt %.

If air is the oxygen-containing gas, typically 10 to 12 kg (lbs) of air are required per kg (lb) of coke fed on catalyst to the regenerator vessel 50. The regenerator vessel 50 typically has a temperature of about 594 (1100° F.) to about 760° C. (1400° F.) and preferably about 649 (1200° F.) to about 704° C. (1300° F.). Pressure may be between 173 kPa (gauge) (25 psig) and 414 kPa (gauge) (60 psig). The superficial velocity of the oxygen-containing gas through the stages 70, 75 and 78 is typically between about 0.3 m/s (1 ft/s) and about 1.2 m/s (4.0 ft/s), and the density of the catalyst in the stages 70, 75 and 78 is typically between about 400 kg/m3 (25 lb/ft3) and about 750 kg/m3 (47 lb/ft3). The density of the flue gas in the dilute phase in the separation section 56 is typically between about 4.8 kg/m3 (0.3 lb/ft3) and about 32 kg/m3 (2 lb/ft3) depending on the characteristics of the catalyst with a superficial velocity of between about 0.6 m/s (2.0 ft/s) and about 1 m/s (3.0 ft/s).

Depending on the size and throughput of a regenerator vessel 50, between about 4 and 60 of the regenerator cyclones 118 may be arranged in the separation section 64. Flue gas may enter a plenum 122, usually near the top of the separation section 56 before exiting through a flue gas outlet 124.

Figure 2:
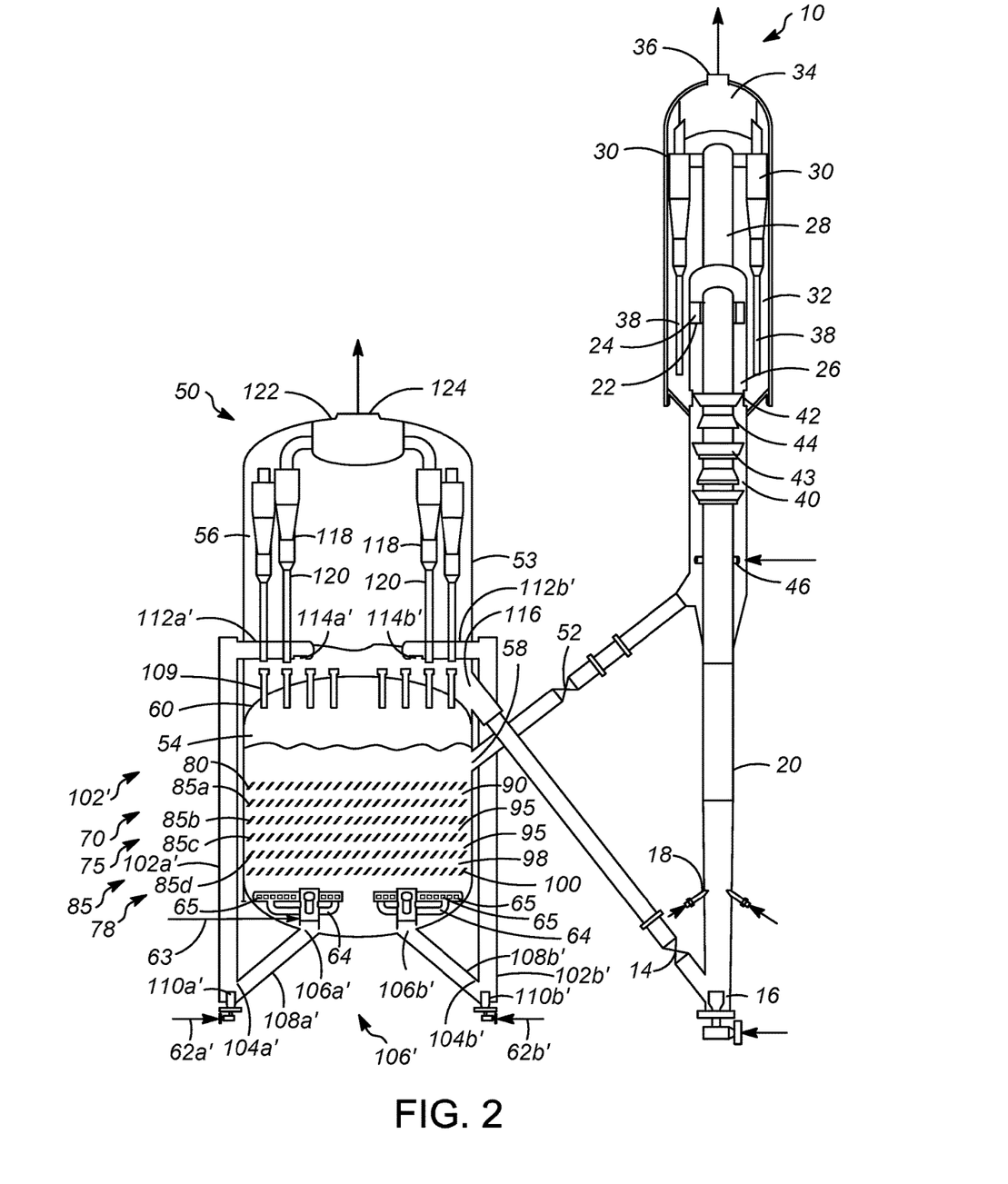
FIG. 2 is a schematic, elevational view of an FCC unit incorporating the present subject matter according to another embodiment.

Turning now to FIG. 2, another FCC unit is addressed with reference to a process and apparatus 200. Many of the elements in FIG. 2 have the same configuration as in FIG. 1 and bear the same respective reference number and have similar operating conditions. Elements in FIG. 2 that correspond to elements in FIG. 1 but have a different configuration bear the same reference numeral as in FIG. 1 but are marked with a prime symbol ('). The apparatus and process in FIG. 2 are the same as in FIG. 1 with the exception of the noted following differences. In accordance with the exemplary embodiment as shown in the FIG. 2, the regeneration section 54 may include a regeneration section outlet 106'. In an embodiment, the regeneration section 54 may include a first regeneration section outlet 106a' and a second regeneration section outlet 106b'. The regenerated catalyst obtained downstream of the one or more stages is passed to a regenerator riser 102' located external to the regenerator vessel. In certain embodiments, the catalyst passed to the regenerator riser 102' may be partially regenerated catalyst. In accordance with an exemplary embodiment as shown in the FIG. 2, a first regenerator riser conduit 108a' and a second regenerator riser conduit 108b' extend from the first regeneration section outlet 106a' and the second regeneration section outlet 106b', respectively, and pass the regenerated catalyst to the bottom of a first regenerator riser 102a' and a second regenerator riser 102b' respectively. As shown, the regenerated catalyst is passed to a first inlet 104a' and a second inlet 104b' of the first regenerator riser 102a' and second regenerator riser 102b' respectively. As explained with above with respect to the FIG. 1, a secondary stream of gas is provided to the regenerator riser 102 to propel the regenerated catalyst from the bottom of the regenerator riser to an outlet located in the separation section 56. In accordance with an exemplary embodiment as shown in the FIG. 2, a first secondary distributor 110a' and a second secondary distributor 110b' may provide a first and second secondary stream of gas respectively to propel the regenerated catalyst up the respective regenerator riser 102a' and 102b'. In some embodiments, the secondary stream of gas may be an oxygen containing gas. In accordance with an exemplary embodiment as shown in the FIG. 2, the secondary stream of gas may be provided by combustion gas in line 62a' and 62b' to the first secondary distributor and second secondary distributor, respectively.

In an embodiment, where partially regenerated catalyst is obtained downstream of the one or more stages, coke on the partially regenerated catalyst provided to the bottom of the first regenerator riser 102a' and the second regenerator riser 102b' may be combusted as the catalyst is propelled upwards through the respective regenerator riser to provide a completely regenerated catalyst from the top of the respective regenerator riser. The completely regenerated catalyst may be discharged from a first outlet 114a' and a second outlet 114b' at the top of the first regenerator riser 102a' and second regenerator riser 102b', respectively. The first regenerator riser 102a' and the second regenerator riser 102b' may include a first disengager 112a' and a second disengager 112b' including the first outlet 114a' and the second outlet 114b' for discharging the regenerated catalyst, respectively. As shown in the FIG. 2, the first outlet 114a' and the second outlet 114b' of the first disengager 112a' and the second disengager 112b' may be positioned in the fluidized bed. The disengager 112a' and 112b' may receive flue gases and catalyst and initially separate catalyst from the second flue gas generated in the first and the second regenerator riser. Rest of the process and apparatus is same as described in FIG. 1

Specific Embodiments

While the following is described in conjunction with specific embodiments, it will be understood that this description is intended to illustrate and not limit the scope of the preceding description and the appended claims.

A first embodiment of the invention is a process for combusting coke from coked catalyst in a regenerator vessel comprising a separation section and a regeneration section located below the separation section, the process comprising providing a coked catalyst to the regeneration section through a catalyst inlet in the regeneration section; passing the coked catalyst downwardly through a one or more stages, each of the one or more stages comprising a permeable barrier; passing a primary stream of oxygen-containing gas upwardly through the one or more stages in counter-current contact with the coked catalyst to combust coke from the coked catalyst to provide a regenerated catalyst and a flue gas; passing the regenerated catalyst from the regeneration section to a bottom of the regenerator riser; propelling the regenerated catalyst via a secondary stream of gas to move the regenerated catalyst from the bottom of the regenerator riser to an outlet located in the separation section; discharging the regenerated catalyst to the separation section from the outlet of the regenerator riser; and passing the regenerated catalyst from a regenerated catalyst outlet in the separation section to a riser reactor through a regenerated catalyst standpipe. An embodiment of the invention is one, any or all of prior embodiments in this paragraph up through the first embodiment in this paragraph, wherein the step of passing the primary stream of oxygen-gas containing gas in counter-current contact with the coked catalyst provides a partially regenerated catalyst. An embodiment of the invention is one, any or all of prior embodiments in this paragraph up through the first embodiment in this paragraph, wherein the step of propelling the regenerated catalyst through the regenerator riser provides a completely regenerated catalyst via combustion of coke from the partially regenerated catalyst. An embodiment of the invention is one, any or all of prior embodiments in this paragraph up through the first embodiment in this paragraph, wherein the bottom of the regenerator riser is located below the regeneration section and in is communication via a regenerator riser conduit extending from a regeneration bottoms outlet to an inlet of the regenerator riser. An embodiment of the invention is one, any or all of prior embodiments in this paragraph up through the first embodiment in this paragraph further comprising delivering the coked catalyst above the one or more stages and distributing the primary stream of oxygen-containing gas below the one or more stages. An embodiment of the invention is one, any or all of prior embodiments in this paragraph up through the first embodiment in this paragraph, wherein a top of the regenerator riser comprises a disengaging zone comprising the outlet for discharging the regenerated catalyst. An embodiment of the invention is one, any or all of prior embodiments in this paragraph up through the first embodiment in this paragraph wherein the permeable barrier inhibits upward movement of the coked catalyst. An embodiment of the invention is one, any or all of prior embodiments in this paragraph up through the first embodiment in this paragraph, wherein the regenerated catalyst outlet is located above the catalyst inlet. An embodiment of the invention is one, any or all of prior embodiments in this paragraph up through the first embodiment in this paragraph, wherein passing the coked catalyst downwardly through the one or more stages comprises passing a first stream of coked catalyst downwardly through a first permeable barrier into a first stage; passing a first stream of oxygen-containing gas upwardly through the first stage in counter-current contact with the first stream of coked catalyst to combust coke from the first stream of coked catalyst to provide a second stream of coked catalyst including regenerated catalyst and a stream of flue gas; passing the stream of flue gas upwardly from the first stage; inhibiting upward movement of the first stream of coked catalyst in the first stage by the first permeable barrier; passing the second stream of coked catalyst downwardly from the first stage to a second stage below the first stage; passing a second stream of oxygen-containing gas upwardly through the second stage in counter-current contact with the second stream of coked catalyst to combust coke from the second stream of coked catalyst to provide a third stream of coked catalyst including regenerated catalyst and the first stream of oxygen-containing gas including flue gas; passing the first stream of oxygen-containing gas from the second stage to the first stage; and inhibiting upward movement of the second stream of coked catalyst in the second stage via a second permeable barrier. An embodiment of the invention is one, any or all of prior embodiments in this paragraph up through the first embodiment in this paragraph further comprising passing the third stream of coked catalyst downwardly from the second stage to a third stage below the second stage; passing a third stream of oxygen-containing gas upwardly through the third stage in counter-current contact with the stream of coked catalyst to combust coke from the coked catalyst to provide a fourth stream of coked catalyst comprising regenerated catalyst and the second stream of oxygen-containing gas including flue gas; and inhibiting upward movement of the third stream of coked catalyst in the third stage.

A second embodiment of the invention is a process for combusting coke from coked catalyst in a regenerator vessel comprising a separation section and a regeneration section located below the separation section, the process comprising providing a coked catalyst to the regeneration section through a catalyst inlet in the regeneration section; passing the coked catalyst downwardly through a one or more stages, each of the one or more stages comprising a permeable barrier; passing a primary stream of oxygen-containing gas upwardly through the one or more stages in counter-current contact with the coked catalyst to combust coke from the coked catalyst to provide a partially regenerated catalyst and a flue gas; passing the partially regenerated catalyst from the regeneration section to a bottom of the regenerator riser; propelling the partially regenerated catalyst via a secondary stream of oxygen-containing gas to move the regenerated catalyst from the bottom of the regenerator riser to an outlet located in the separation section while combusting coke from the partially regenerated catalyst to provide a completely regenerated catalyst; discharging the completely regenerated catalyst to the separation section from the outlet of the regenerator riser; and passing the completely regenerated catalyst from a regenerated catalyst outlet in the separation section to a riser reactor through a regenerated catalyst standpipe.

A third embodiment of the invention is an apparatus for combusting carbonaceous deposits from catalyst comprising a) a regeneration section comprising (i) a catalyst inlet for feeding coked catalyst; (ii) a one or more stages located below the catalyst inlet, each of the one or more stages comprising a permeable barrier comprising openings sized to permit the coked catalyst to pass through downwardly, the permeable barrier extending laterally across the regenerator vessel; and (ii) a combustion gas distributor for passing a primary stream of oxygen-containing gas upwardly through the one or more stages in counter-current contact with the coked catalyst to combust coke from the coked catalyst to provide a regenerated catalyst and a flue gas; b) a regenerator riser comprising (i) an inlet in a bottom of the regenerator riser in downstream communication with regeneration section via a regeneration section outlet for receiving the regenerated catalyst; and (ii) an outlet of the regenerator riser for discharging the regenerated catalyst; and c) a separation section above the regeneration section, the separation section comprising (i) one or more cyclone separators for separating catalyst from the flue gas; (ii) a regenerated catalyst outlet; (iii) the outlet of the regenerator riser; and (iv) a flue gas outlet in the regenerator vessel. An embodiment of the invention is one, any or all of prior embodiments in this paragraph up through the third embodiment in this paragraph, wherein the bottom of the regenerator riser is located below the regeneration section and in is communication via a regenerator riser conduit extending from a regeneration section outlet to the inlet in the bottom of the regenerator riser. An embodiment of the invention is one, any or all of prior embodiments in this paragraph up through the third embodiment in this paragraph, wherein the regenerated catalyst outlet is located above the catalyst inlet. An embodiment of the invention is one, any or all of prior embodiments in this paragraph up through the third embodiment in this paragraph, wherein the regenerator riser is located inside the regenerator. An embodiment of the invention is one, any or all of prior embodiments in this paragraph up through the third embodiment in this paragraph, wherein the regenerator riser is located external to the regenerator. An embodiment of the invention is one, any or all of prior embodiments in this paragraph up through the third embodiment in this paragraph further comprising one or more vent tubes for passage of the flue gas from the regeneration section to the separation section. An embodiment of the invention is one, any or all of prior embodiments in this paragraph up through the third embodiment in this paragraph, wherein regeneration section comprises at least two stages comprising a first permeable barrier below the catalyst inlet, the first permeable barrier extending laterally across the regenerator vessel; a second permeable barrier below the first permeable barrier to define a second stage, the second permeable barrier extending laterally across the regenerator vessel; and the regeneration bottoms outlet below the second permeable barrier. An embodiment of the invention is one, any or all of prior embodiments in this paragraph up through the third embodiment in this paragraph wherein the second permeable barrier is spaced below the first permeable barrier. An embodiment of the invention is one, any or all of prior embodiments in this paragraph up through the third embodiment in this paragraph further comprising a third permeable barrier below the second permeable barrier and above the regenerator bottoms outlet, the third permeable barrier extending laterally across the regenerator vessel.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for combusting coke from coked catalyst in a regenerator vessel comprising a separation section and a regeneration section located below the separation section, the process comprising:
    providing a coked catalyst to the regeneration section through a catalyst inlet in the regeneration section;
    passing the coked catalyst downwardly through a one or more stages, each of the one or more stages comprising a permeable barrier;
    passing a primary stream of oxygen-containing gas upwardly through the one or more stages in counter-current contact with the coked catalyst to combust coke from the coked catalyst to provide a regenerated catalyst and a flue gas;
    passing the regenerated catalyst from the regeneration section to a bottom of the regenerator riser;
    propelling the regenerated catalyst via a secondary stream of gas to move the regenerated catalyst from the bottom of the regenerator riser to an outlet located in the separation section;
    discharging the regenerated catalyst to the separation section from the outlet of the regenerator riser; and
    passing the regenerated catalyst from a regenerated catalyst outlet in the separation section to a riser reactor through a regenerated catalyst standpipe.

2. The process of claim 1, wherein the step of passing the primary stream of oxygen-gas containing gas in counter-current contact with the coked catalyst provides a partially regenerated catalyst.

3. The process of claim 2, wherein the step of propelling the regenerated catalyst through the regenerator riser provides a completely regenerated catalyst via combustion of coke from the partially regenerated catalyst.

4. The process of claim 1, wherein the bottom of the regenerator riser is located below the regeneration section and in is communication via a regenerator riser conduit extending from a regeneration bottoms outlet to an inlet of the regenerator riser.

5. The process of claim 1 further comprising delivering the coked catalyst above the one or more stages and distributing the primary stream of oxygen-containing gas below the one or more stages.

6. The process of claim 1, wherein a top of the regenerator riser comprises a disengaging zone comprising the outlet for discharging the regenerated catalyst.

7. The process of claim 1 wherein the permeable barrier inhibits upward movement of the coked catalyst.

8. The process of claim 1, wherein the regenerated catalyst outlet is located above the catalyst inlet.

9. The process of claim 1, wherein passing the coked catalyst downwardly through the one or more stages comprises:
passing a first stream of coked catalyst downwardly through a first permeable barrier into a first stage;
passing a first stream of oxygen-containing gas upwardly through the first stage in counter-current contact with the first stream of coked catalyst to combust coke from the first stream of coked catalyst to provide a second stream of coked catalyst including regenerated catalyst and a stream of flue gas;
passing the stream of flue gas upwardly from the first stage;
inhibiting upward movement of the first stream of coked catalyst in the first stage by the first permeable barrier;
passing the second stream of coked catalyst downwardly from the first stage to a second stage below the first stage;
passing a second stream of oxygen-containing gas upwardly through the second stage in counter-current contact with the second stream of coked catalyst to combust coke from the second stream of coked catalyst to provide a third stream of coked catalyst including regenerated catalyst and the first stream of oxygen-containing gas including flue gas;
passing the first stream of oxygen-containing gas from the second stage to the first stage; and
inhibiting upward movement of the second stream of coked catalyst in the second stage via a second permeable barrier.

10. The process of claim 9 further comprising:
passing the third stream of coked catalyst downwardly from the second stage to a third stage below the second stage;
passing a third stream of oxygen-containing gas upwardly through the third stage in counter-current contact with the stream of coked catalyst to combust coke from the coked catalyst to provide a fourth stream of coked catalyst comprising regenerated catalyst and the second stream of oxygen-containing gas including flue gas; and
inhibiting upward movement of the third stream of coked catalyst in the third stage.

11. A process for combusting coke from coked catalyst in a regenerator vessel comprising a separation section and a regeneration section located below the separation section, the process comprising:
providing a coked catalyst to the regeneration section through a catalyst inlet in the regeneration section;
passing the coked catalyst downwardly through a one or more stages, each of the one or more stages comprising a permeable barrier;
passing a primary stream of oxygen-containing gas upwardly through the one or more stages in counter-current contact with the coked catalyst to combust coke from the coked catalyst to provide a partially regenerated catalyst and a flue gas;
passing the partially regenerated catalyst from the regeneration section to a bottom of the regenerator riser;
propelling the partially regenerated catalyst via a secondary stream of oxygen-containing gas to move the regenerated catalyst from the bottom of the regenerator riser to an outlet located in the separation section while combusting coke from the partially regenerated catalyst to provide a completely regenerated catalyst;
discharging the completely regenerated catalyst to the separation section from the outlet of the regenerator riser; and
passing the completely regenerated catalyst from a regenerated catalyst outlet in the separation section to a riser reactor through a regenerated catalyst standpipe.

12. A regenerator vessel for combusting carbonaceous deposits from catalyst comprising:
(a) a regeneration section comprising:
(i) a catalyst inlet for feeding coked catalyst;
(ii) a one or more stages located below the catalyst inlet, each of the one or more stages comprising a permeable barrier comprising openings sized to permit the coked catalyst to pass through downwardly, the permeable barrier extending laterally across the regenerator vessel; and
(ii) a combustion gas distributor for passing a primary stream of oxygen-containing gas upwardly through the one or more stages in counter-current contact with the coked catalyst to combust coke from the coked catalyst to provide a regenerated catalyst and a flue gas;
(b) a regenerator riser comprising:
(i) an inlet in a bottom of the regenerator riser in downstream communication with regeneration section via a regeneration section outlet for receiving the regenerated catalyst; and
(ii) an outlet of the regenerator riser for discharging the regenerated catalyst; and
(c) a separation section above the regeneration section, the separation section comprising:
(i) one or more cyclone separators for separating catalyst from the flue gas;
(ii) a regenerated catalyst outlet;
(iii) the outlet of the regenerator riser; and
(iv) a flue gas outlet in the regenerator vessel.

13. The regenerator vessel of claim 12, wherein the bottom of the regenerator riser is located below the regeneration section and in is communication via a regenerator riser conduit extending from a regeneration section outlet to the inlet in the bottom of the regenerator riser.

14. The regenerator vessel of claim 12, wherein the regenerated catalyst outlet is located above the catalyst inlet.

15. The regenerator vessel of claim 12, wherein the regenerator riser is located inside the regenerator.

16. The regenerator vessel of claim 12, wherein the regenerator riser is located external to the regenerator.

17. The regenerator vessel of claim 12 further comprising one or more vent tubes for passage of the flue gas from the regeneration section to the separation section.

18. The regenerator vessel of claim 12, wherein regeneration section comprises at least two stages comprising:
   a first permeable barrier below the catalyst inlet, the first permeable barrier extending laterally across the regenerator vessel;
   a second permeable barrier below the first permeable barrier to define a second stage, the second permeable barrier extending laterally across the regenerator vessel; and
   the regeneration bottoms outlet below the second permeable barrier.

19. The regenerator vessel of claim 18 wherein the second permeable barrier is spaced below the first permeable barrier.

20. The regenerator vessel of claim 18 further comprising a third permeable barrier below the second permeable barrier and above the regenerator bottoms outlet, the third permeable barrier extending laterally across the regenerator vessel.

* * * * *